United States Patent
Vigna et al.

(10) Patent No.: US 7,097,800 B2
(45) Date of Patent: Aug. 29, 2006

(54) PROCESS FOR MAKING A FLUID PROCESSING MODULE

(75) Inventors: James J. Vigna, Billerica, MA (US); James E. Kelly, Jr., Melrose, MA (US); Wayne S. Merrill, Derry, NH (US)

(73) Assignee: Millipore Corporation, Billerica, MA (US)

( * ) Notice: Subject to any disclaimer, the term of this patent is extended or adjusted under 35 U.S.C. 154(b) by 271 days.

(21) Appl. No.: 10/246,137

(22) Filed: Sep. 18, 2002

(65) Prior Publication Data

US 2003/0052429 A1    Mar. 20, 2003

(51) Int. Cl.
*B29C 65/18* (2006.01)

(52) U.S. Cl. ............. 264/234; 264/345; 264/DIG. 48

(58) Field of Classification Search ............ 264/234, 264/238, 345, DIG. 48
See application file for complete search history.

(56) References Cited

U.S. PATENT DOCUMENTS 4,576,715 A * 3/1986 Michaels et al. ............ 210/347
4,797,259 A * 1/1989 Matkovich et al. .......... 422/101
5,422,057 A * 6/1995 Karbachsch et al. ........ 264/257
5,429,742 A   7/1995 Gutman et al.

FOREIGN PATENT DOCUMENTS

| DE | 29618092 | 12/1996 |
| GB | 2302042 | 1/1997 |
| RU | 2029610 C1 * | 2/1995 |
| WO | WO9936150 | 7/1999 |

OTHER PUBLICATIONS

Patent abstracts of Japan, vol. 012, No. 096 (C-484), Mar. 29, 1988, & JP 62 227417 A (Tsuchiya Mfg Co. Ltd) Oct. 6, 1987 abstract.
Copy of International Search Report.

* cited by examiner

*Primary Examiner*—Edmund H. Lee
(74) *Attorney, Agent, or Firm*—Millipore Corporation

(57) ABSTRACT

A process for making a fluid processing module is provided wherein a plurality of filtration elements is alternated with a fluid porous layer to form a stack. The filtration elements comprise a membrane sheet having a thermoplastic element bonded to a portion of an edge of the membrane. An opening is provided either through the membrane or through the thermoplastic element. A portion of the thermoplastic element extends into the opening and can be sealed to an adjacent positioned thermoplastic element to seal the porous sheet positioned between adjacently positioned membranes from fluid communication with the opening. Sealing can be effected by extending a heating element through the opening of the stack to effect simultaneous sealing of a plurality of thermoplastic elements.

18 Claims, 10 Drawing Sheets

PROCESS FOR MAKING A FLUID PROCESSING MODULE

BACKGROUND OF THE INVENTION

This invention relates to a process for making a fluid processing module such as a membrane filtration apparatus for effecting filtration of a liquid composition wherein a feed liquid is introduced into the apparatus and a filtrate stream and, optionally a retentate stream are removed from the apparatus. More particularly, this invention relates to a process for making a fluid processing module such as membrane filtration apparatus that are formed by indirect heat sealing of a polymeric composition.

For convenience, this invention will be described in detail with reference to a filtration module. However, it is to be understood that the process of this invention is equally applicable for making other fluid processing modules such as manifolds, heat exchangers, dialysers, desalters, degassers and the like. Prior to the present invention, liquids have been filtered within a plurality of filter modules that are stacked between manifolds or individually sealed to a manifold plate. Each module includes a one or more filter layers separated by appropriate spacer layers, such as screens, to permit liquid feed flow into the apparatus as well as filtrate flow from the apparatus. Filtration within the module can be conducted as a tangential flow filtration (TFF) process wherein incoming feed liquid is flowed tangentially over a membrane surface to form a retentate and a filtrate. Alternatively, filtration can be conducted as a dead end mode otherwise identified as normal flow filtration (NFF) wherein all incoming feed liquid is passed through a membrane filter with retention of solids and other debris on the membrane filter. In this latter mode only a filtrate is recovered.

At the present time, a filtrate stream is sealed from a feed stream within a membrane filtration apparatus by sealing techniques utilizing potting adhesives such as epoxies, urethanes or silicones, solvent bonding or direct heat sealing. In the case of a tangential flow filtration apparatus, a filtrate stream is sealed from a feed stream and a retentate stream. Adhesives are undesirable since they have limited chemical compatibility, are a source of significant extractable species, introduce process control difficulties, impose bond strength limitations, impose use temperature limitations and increase process cycle time. Direct heat sealing wherein a heating element contacts a material that flows to form a seal is undesirable since its use imposes a minimal limitation upon the thickness of the material being heat sealed. This results in a reduction of the number of layers that can be present in a given volume of the filtration module, thereby undesirably reducing the filtration capacity of the module. In addition, direct heat sealing is undesirable because it requires multiple steps, imposes material compatibility limitations, and typically utilizes a substrate to effect direct heat-sealing of filtration elements and can cause membrane damage. Solvent bonding is undesirable since solvents impose environmental issues and process variability while potentially useful polymers are limited by their solvation characteristics.

U.S. Pat. No. 5,429,742 discloses a filter cartridge comprising a thermoplastic frame into which are molded a plurality of filtration membranes. The thermoplastic frame is molded to provide fluid pathways that assure incoming fluid to be filtered to be passed through a membrane prior to removing filtered fluid from the filter cartridge. The frame is sufficiently thick so that fluid pathways to and from the membranes can be formed. Since adjacent membranes are separated by relatively thick spacer members, membrane area per unit volume of the filter cartridge is undesirably low.

Accordingly, it would be desirable to provide a method for making a fluid processing module such as a multilayer filtration apparatus which utilizes a plurality of filtration elements wherein the layers are appropriately sealed without the use of adhesive, solvent bonding or direct heat sealing. In addition, it would be desirable to provide a process for making a fluid processing module tangential flow containing a large number of layers such as filtration layers per volume of filtration apparatus which can be formed into a stack and which can be appropriately sealed to define liquid flow paths within the stack. Such a filtration apparatus would provide a high filtration capacity and would permit multiple uses of the apparatus.

SUMMARY OF THE INVENTION

The present invention provides a method for forming a fluid processing module such as a filtration apparatus formed of filtration elements which are sealed with a thermoplastic polymeric composition in a manner which promotes sealing to a polymeric porous membrane while avoiding thermal or mechanical degradation of the membrane. Selective sealing of the porous polymeric membrane is effected in a two step process wherein at least one end of each membrane is sealed with a thermoplastic polymeric composition to secure the thermoplastic polymeric composition to the membrane. Selected layers of thermoplastic polymeric compositions on adjacently positioned membranes then are sealed to each other in order to define fluid flow paths through the stack of alternately positioned membranes and spacer layers. The defined fluid flow paths assure that fluid to be filtered passes through a membrane prior to being removed from the filtration apparatus. Sealing can be effected as a single step wherein a stack of alternately positioned membranes and spacers are subjected to radiant energy which effects heating of selected layers thereby to effect the desired sealing. Alternatively, sealing can be effected of a single set of a membrane and a spacer sequentially until a desired stack of alternately positioned membranes and spacers is sealed in the desired configuration.

In accordance with this invention, a dead ended or tangential flow filtration apparatus is provided which includes a plurality of spaced-apart membranes and a plurality of spacer layers having channels or openings that promote liquid flow through the apparatus. The NFF filtration apparatus is provided with at least one feed port and at least one filtrate port. The tangential flow filtration apparatus is provided with at least one feed port, at least one filtrate port and at least one retentate port. Membrane layers and spacer layers are alternated through the vertical height of the filtration apparatus in selected patterns. Selective sealing of the membrane layers and the spacer layers is effected in a two step process. In a first step, a thin layer of a thermoplastic polymeric composition is molded onto end portions of each membrane layer that can comprise a membrane or a composite membrane, such as a membrane supported on a screen layer. The thermoplastic polymer composition is molded in a pattern which effects desired fluid flow through the modules. The thus treated membranes and spacer layers are then stacked in a manner to preliminarily form a feed port, a filtrate port and, in the case of a tangential flow module, a retentate port. The final step of indirect heat-sealing of thermoplastic polymeric composition preliminarily sealed to the membrane layers then is selectively effected to form fluid flow channels that separate feed and retentate from filtrate within the module. In the case of a tangential flow filtration apparatus, liquid flow within the stack is assured by sealing the feed inlet and the retentate outlet from the filtrate outlet. The outer portion of the filtration apparatus is then formed by insert molding. Insert molding is accomplished by positioning the stack within an injection mold and injecting the molten polymeric composition into the mold to effect sealing in a manner that assures the desired liquid flow within the final membrane filtration apparatus during use. The spacer layers that accept filtrate are sealed by the plastic composition from a feed port extending into the stack so that the feed must pass through a membrane layer prior to entering a filtrate spacer layer. In addition, the spacer layers adjacent to the feed port that are designated to accept feed remain in liquid communication with the feed channel. Channels that accept either retentate or filtrate also extend into the stack. The channels that accept retentate are sealed from the filtrate spacer layers and are in fluid communication with the spacer layers that are also in fluid communication with the feed port. The channels can extend through the membranes or through thermoplastic tabs that are sealed to at least a portion of the periphery of the membranes. The port or ports that accept filtrate are sealed from the spacer layers that accept feed or retentate and are in fluid communication with the spacer layers that accept filtrate. The stack is also sealed in a manner so that liquid feed entering the feed spacer layers must pass through a membrane before entering a filtrate spacer layer.

DESCRIPTION OF SPECIFIC EMBODIMENTS

The present invention utilizes filtration membrane elements that can be selectively sealed in a stacked configuration to effect separation of filtrate from feed or feed and retentate. The filtration membrane element comprises a membrane layer having one edge thereof bonded to a thermoplastic polymeric composition. Preferably, the bonded thermoplastic polymeric composition has a top surface and a bottom surface configured so that they converge toward each other and form an end or tip area. The end or tip area is configured so that it absorbs radiant heat energy or a non heat energy such as ultrasonic energy which is absorbed by the end and converted to heat energy. When exposed to such energy, the end or tip preferentially melts prior to the main body of the thermoplastic polymeric composition. This feature permits control of the direction that the molten thermoplastic polymeric composition flows that, in turn, permits controlling selective areas of a filtration apparatus to be sealed. Heating also can be effected by contact with a heated element such as a heated rod.

The filtration membrane elements can be sealed one-by-one to each other or can be sealed to each other in a desired configuration in a one-step process while positioned in a stack of filtration membrane elements of this invention.

The filtration membrane elements useful for forming the filtration module of this invention are formed by modifying an end of a filtration membrane by sealing a thermoplastic polymeric composition (TPC) to an edge or perimeter of the filtration membrane. The (TPC) surfaces can be sealed to adjacent (TPC) surfaces to effect sealing in a manner that effects sealing of alternatively positioned spacers in a stack of membranes alternating with spacers. Sealing is effected so that any given membrane is sealed on one edge and open on an opposing edge. Adjacently positioned membranes separated by an open layer such as a screen are sealed on opposite edges. This arrangement assures that a feed stream entering an open layer in a stack of membranes and passes through a membrane prior to being collected as filtrate. By operating in this manner, mixing of filtrate with either a feed stream or retentate stream is prevented.

Figure 1:
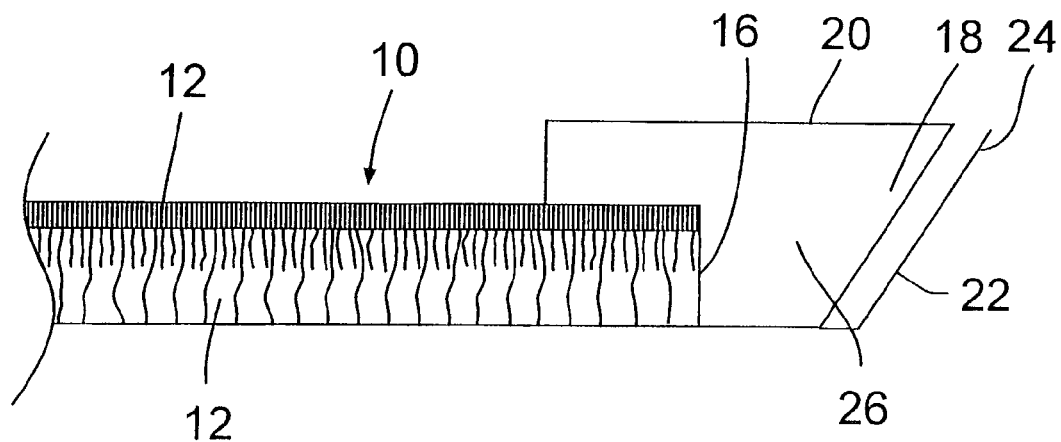
FIG. 1 is a side view of a modified membrane structure of this invention.

Referring to FIG. 1, a modified membrane structure useful for forming the filtration module of this invention is shown when the membrane is an ultrafiltration membrane 10 having a skin 12 and a layer 14 more porous than the skin 12. The end 16 is bonded to a (TPC) 18 so that the membrane 10 is sealed at the end 16 by the TPC 18. The TPC 18 is configured to have a top surface 20 and a bottom surface 22 which converge to form tip 24. The tip 24 functions to concentrate energy such as radiant or ultrasonic energy to effect melting from tip 24 to the body 26 of the (TPC). However, it is to be understood that the TPC need not have converging surfaces and for example, have a flat end or a curved end or the like. A TPC having converging surfaces is preferred since such a surface configuration effectively concentrates radiant or ultrasonic energy at the tip of the TPC.

Figure 2:
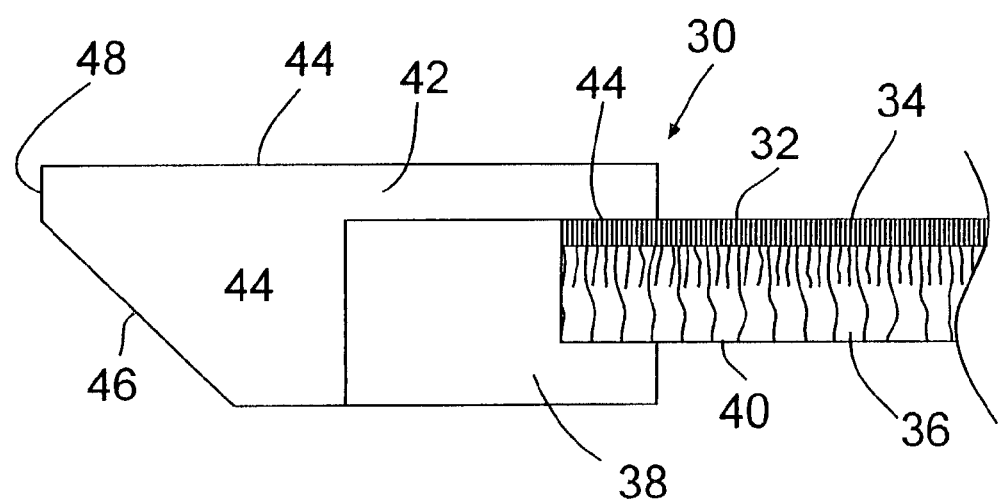
FIG. 2 is a side view of an alternative modified membrane structure of this invention.

Referring to FIG. 2, the construction of an alternative filtration composite membrane 30 useful for forming the filtration module of this invention is shown wherein the membrane includes a low porosity skin 32, a volume 34 having more open pores than skin 32 and a support layer 36 being formed from a more open layer such as spun polypropylene fiber. The composite membrane 30 includes a first molding section 38 that is molded to the bottom surface 40 of composite membrane 30 and a second molding section 42 of composite membrane 30. Second molding section 42 includes bottom surface 46 and top surface 49 which converge into tip area 48. Tip surface 48 preferentially melts when exposed to energy such as radiant heat or ultrasonic energy over the body 44 of the TPC.

Figure 3:
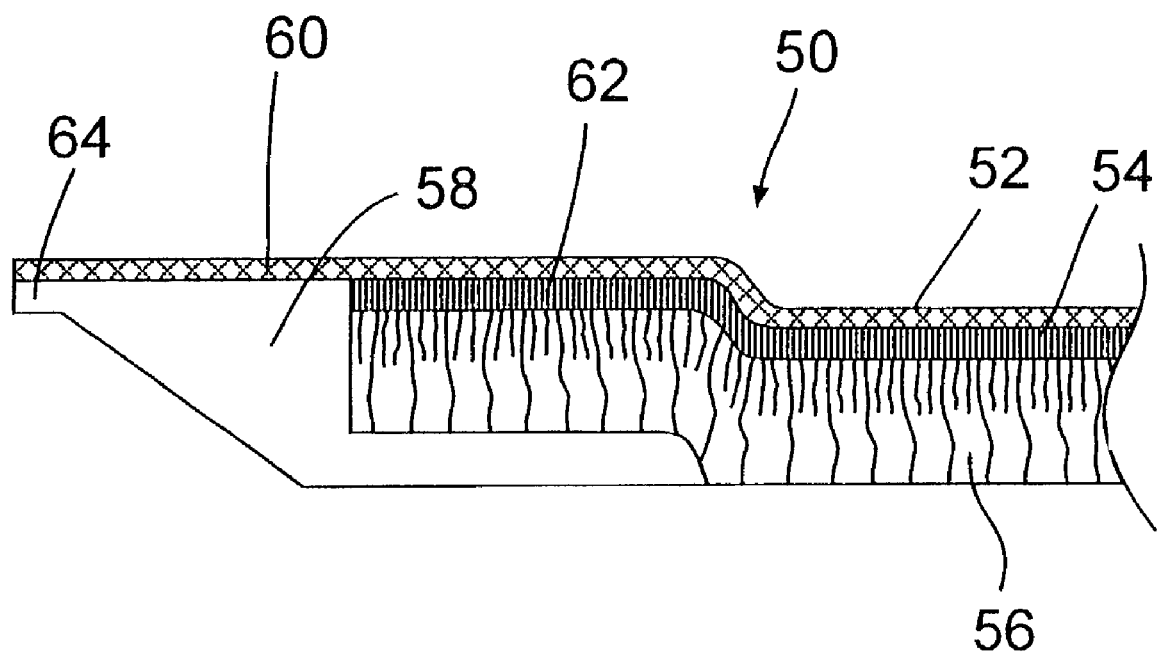
FIG. 3 is a side view of an alternative modified membrane structure of this invention.

Referring to FIG. 3, an alternative membrane useful for forming the filtration module of this invention is shown wherein a membrane is shown which presents difficulty in bonding to the TPC of choice. The composite membrane 51 includes a skin 55, a porous body 54 and a porous support 56 is bonded to the TPC 58. The skin 55 can be difficult to be bonded by virtue of its composition such as a glycerin filled layer, or its low porosity. To improve bonding, a porous screen 60 can be positioned on the top surface of the skin 55 to effect absorption of molten TPC 58, thereby to improve bonding function to skin 52. The tip 64 functions to concentrate energy as described above to effect selective melting of the TPC 58 selectively fuse it to the TPC on adjacent layer. This selective fusion blocks fluid flow past tip 64.

Figure 4:
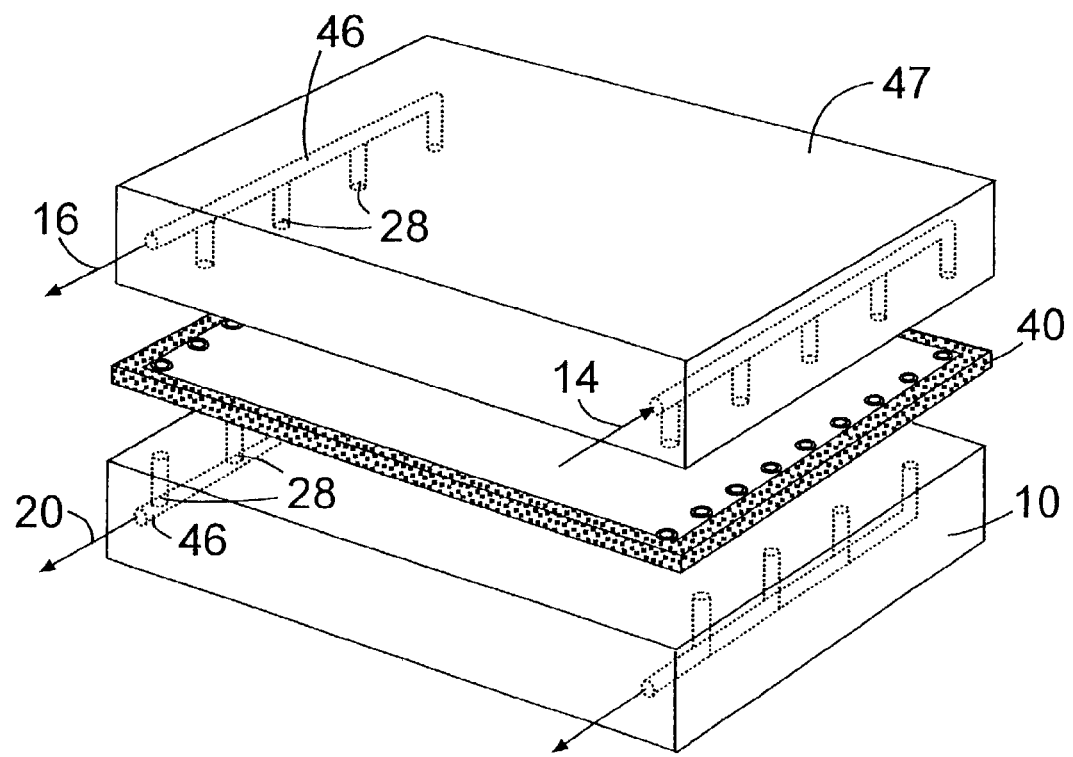
FIG. 4 illustrates fluid flow through a tangential flow filtration module of this invention.

Referring to FIG. 4, a filtration module including the manifold is shown. A filtration element 40 is positioned between manifold 47 and manifold 11. Manifold 47 is provided with feed inlet 15 and filtrate outlets 17. Manifold 11 is provided with filtrate outlet 21 and retentate outlet 19. One set of filtrate outlet means 28 is provided on the manifold 11 while a second set of filtrate outlet means 29 is provided on the manifold 47. The filtrate outlet means 28 and 29 are connected to filtrate outlets 17 and 21 by filtrate conduit paths 46. The filtration element 40 includes holes 48 which communicate with liquid inlet means 15 and holes 50 which communicate with filtrate outlet means 28 and 29.

Figure 5:
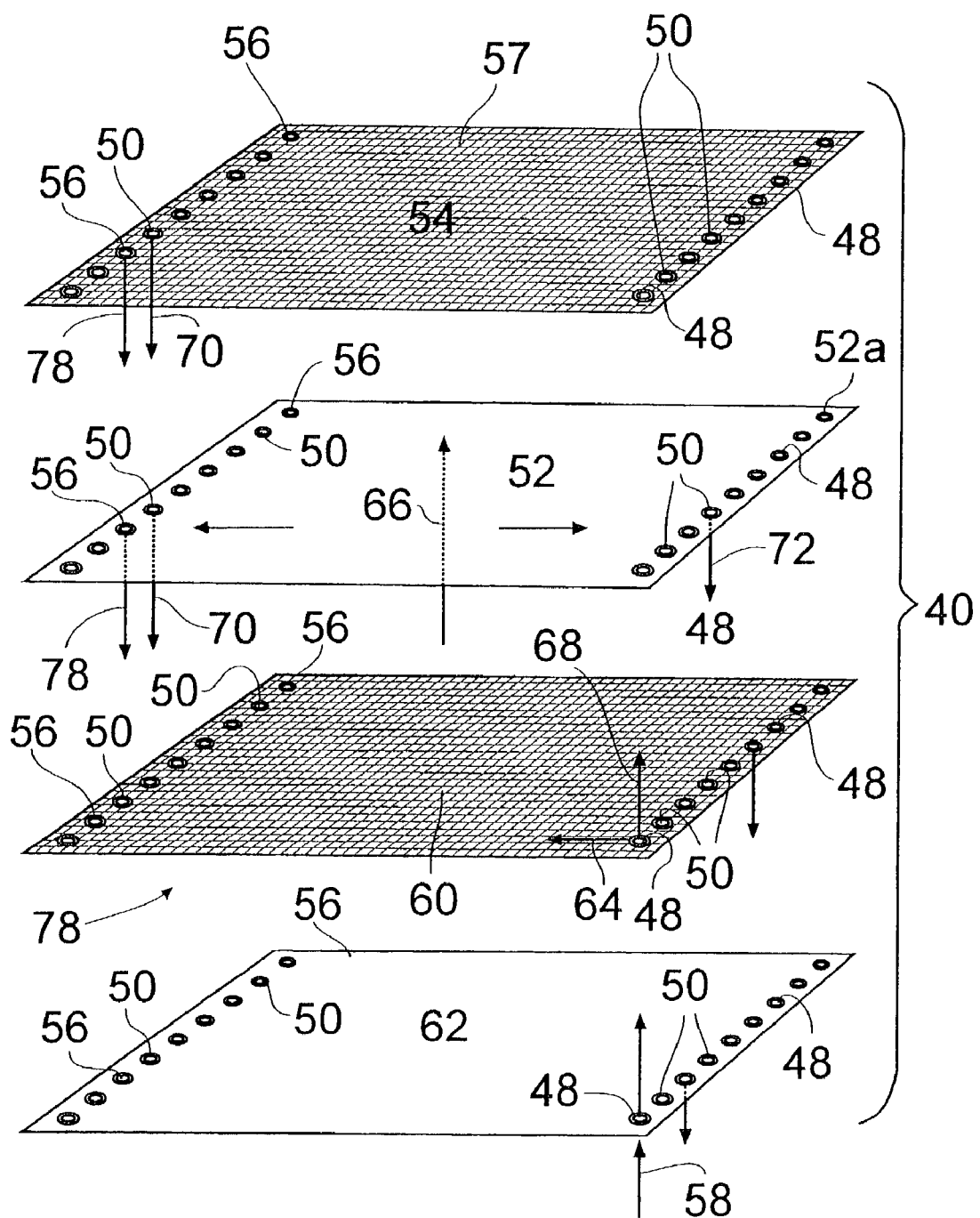
FIG. 5 illustrates fluid flow through a tangential flow apparatus of this invention.

Referring to FIG. 5, the filtration element 40 includes a filtrate spacer 59, a filter layer 53, a retentate spacer 60 and a filter layer 62 with a second filtrate spacer (not shown) and which can contact conduit paths 46 (FIG. 4). The liquid feed represented by arrow 61 passes through holes 48 in layer 62 into spacer 60. A portion of the liquid passes horizontally through spacer 60, as represented by arrow 64 and vertically through filter 53 as represented by arrow 66. The remaining portion of the incoming liquid passes upwardly as represented by arrow 68, through holes 48 in filter layer 53, holes 48 in filtrate spacer 59 and into the next adjacent filtration member (not shown) wherein it proceeds as described above with reference to filtration element 40. The filtrate passes into holes 50 and passes in a direction as shown by arrows 70 and 72 toward filtrate outlet means 21 (FIG. 4). Hole 48 alternates with holes 50. The retentate passes across retentate spacer 60 as represented by arrow 64, through holes 50 and to retentate outlet means 19 (FIG. 4).

Figure 6:
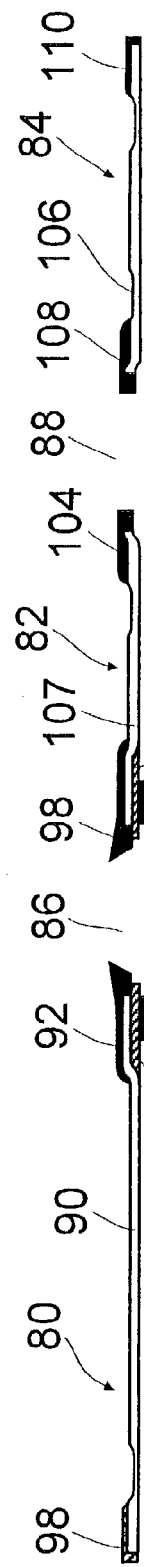
FIG. 6 is a side view of a modified membrane utilized to form the filtration apparatus of this invention.

Referring to FIG. 6, a membrane layer of the filtration construction of this invention is formed from membrane elements 80, 82 and 84 which are spaced apart to form a feed port 86 and a permeate port 88. The element 80 is formed from membrane layer 90, a TPC 92, a spacer layer 94, a thermoplastic seal section 96 and a thermoplastic seal section 98. Membrane element 82 is formed from membrane layer 107, thermoplastic seal section 98, spacer layer 100, thermoplastic seal section 102 and thermoplastic seal section 104. Membrane element 84 is formed from membrane layer 106, thermoplastic seal section 108 and thermoplastic seal section 110.

Figure 7:
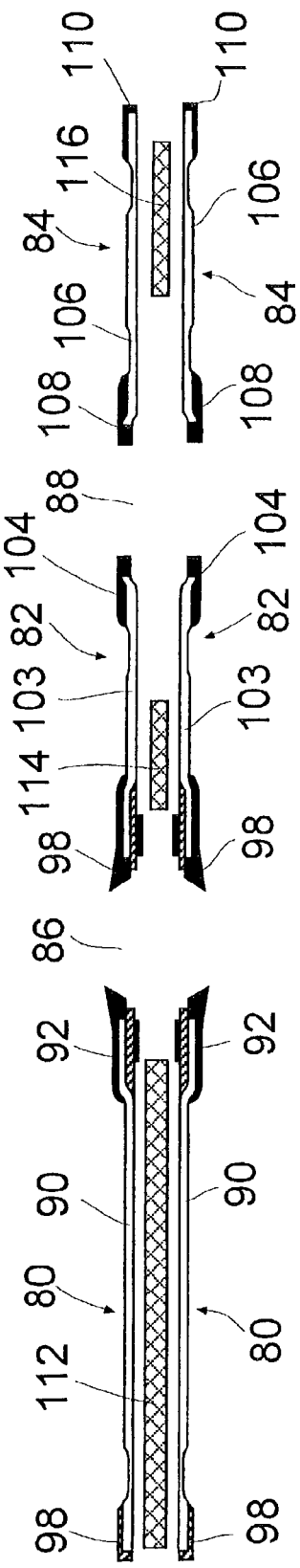
FIG. 7 is a side view of two membranes and one spacer layer utilized to form the filtration modules shown in FIG. 8.

Referring to FIG. 7, a spacer layer is positioned between two membrane elements 80. A spacer layer 114 is positioned between two membrane elements 82. A spacer layer 116 is positioned between two membrane elements 84.

Figure 8:
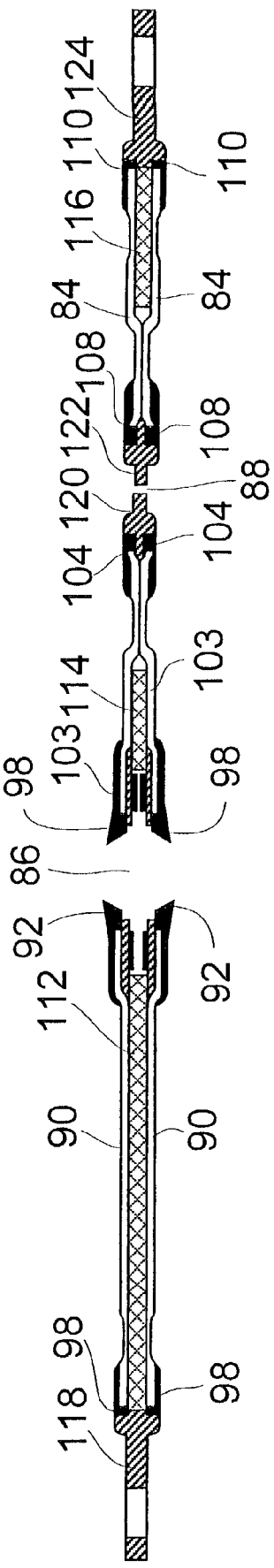
FIG. 8 is a side view of filtration modules of this invention.

Referring to FIG. 8, thermoplastic seal sections 98 are joined together with a thermoplastic seal 118. Thermoplastic seal sections 104 are joined together with thermoplastic seal 120. Thermoplastic seal sections 108 are joined together with thermoplastic seal 122. Thermoplastic seal sections 110 are joined together with thermoplastic seal 124.

Figure 9:
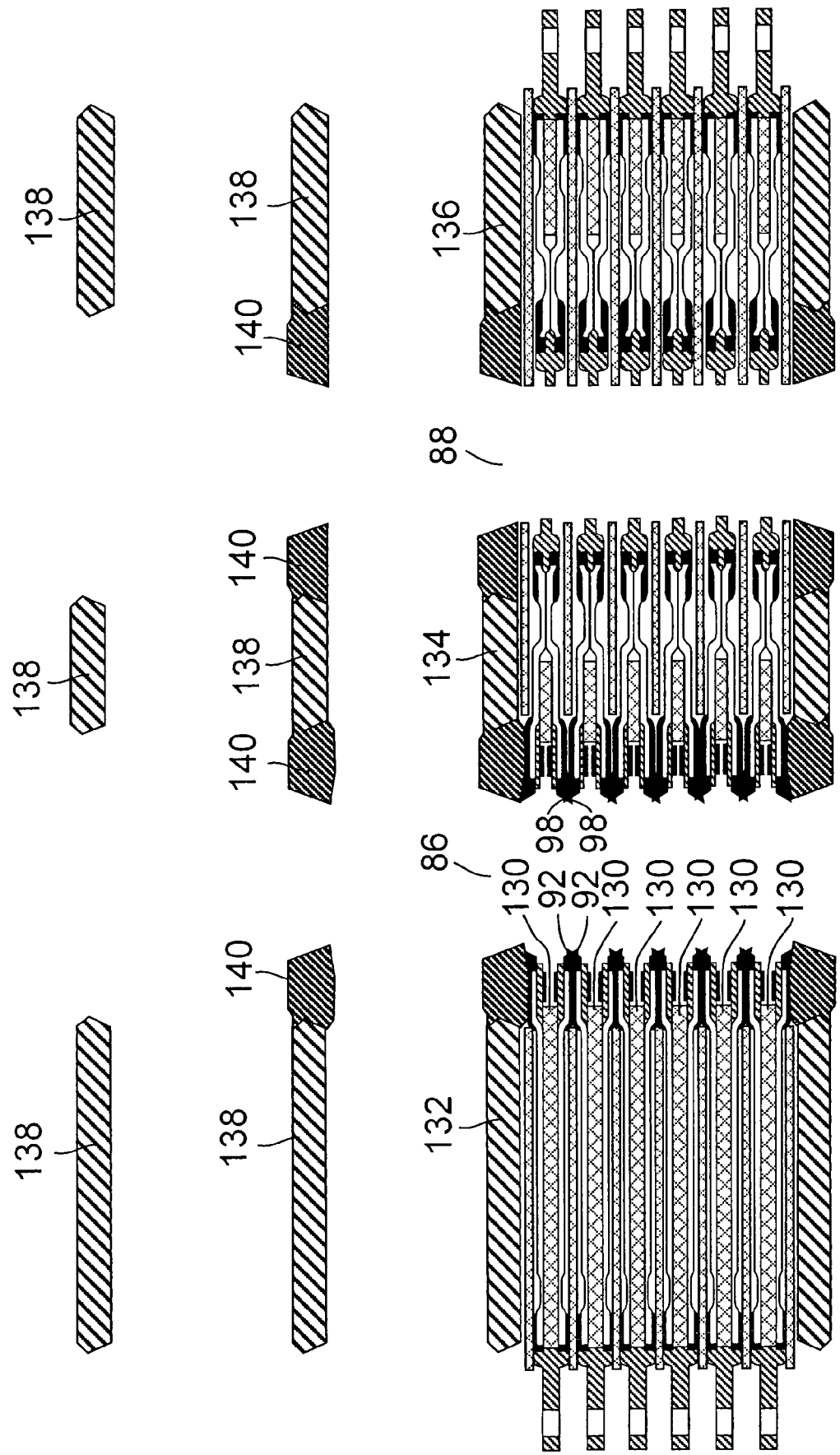
FIG. 9 is an exploded cross sectional view of filtration and housing elements utilized to form the filtration apparatus of this invention.

Sealing to the construction of this invention will be described with reference to FIGS. 9, 10 and 11. A stack of the membrane and spacer elements shown in FIG. 8 are vertically positioned with spacers 130 interposed between them. Thermoplastic endplates 132, 134 and 136 are formed from a thermoplastic material and a resilient thermoplastic elastomer 140. The resilient thermoplastic elastomer 140 is adapted to be sealed such as by heat sealing or ultrasonic bonding to the thermoplastic end plates 132, 134 and 136. In addition, resilient thermoplastic elastomer 140 is positioned to cooperate with a pressure plate (not shown) to exert pressure through the vertical height of the filtration construction of this invention.

Figure 10:
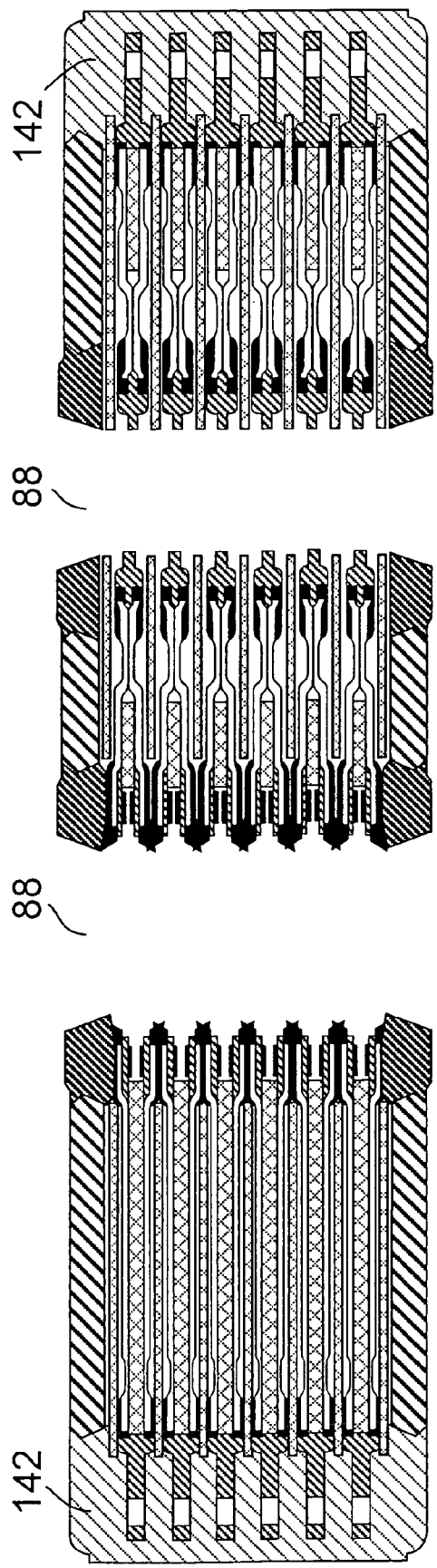
FIG. 10 is a cross sectional view illustrating a final position of filtrate elements of this invention prior to a final forming step for the filtration apparatus.
Figure 11:
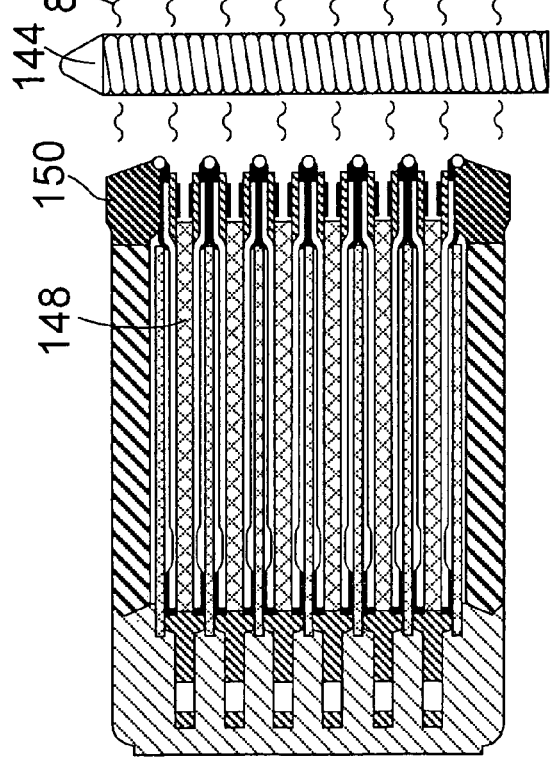
FIG. 11 is a cross sectional view illustrating the final step in forming filtration apparatus of this invention.

As shown in FIG. 10, the periphery of the stack of membranes and spacers is sealed together with a thermoplastic outer housing 142 by casting or injection molding. In a final step, adjacently positioned thermoplastic constructions 92 and 98 (FIG. 8) are sealed together with radiant seal 144. Sealing means 144 can comprise a radiant seal, an ultrasonic seal or direct contact. Sealing means 144 is positioned sufficiently far from spacers 146 and 148 so as to prevent sealing of openings 150 and 152 so that fluid communication can be effected between conduit 86, spacers 148 and spacers 152. In addition, filtrate conduit 88 is in selective communication with spacers 154 and 156. In this manner, mixing of feed and retentate filtrate is prevented.

Figure 12:
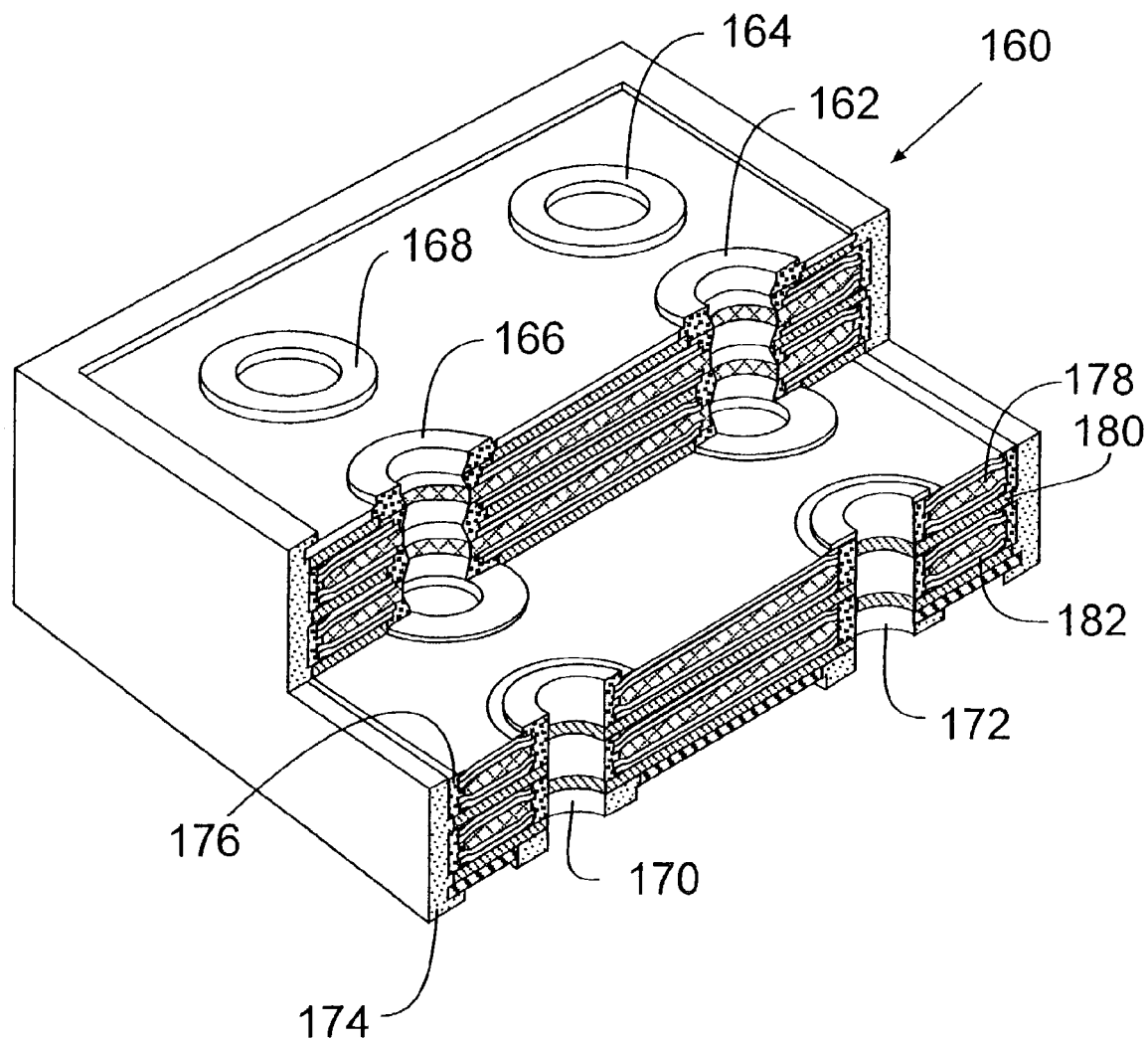
FIG. 12 is a perspective view in partial cross-section of a filtration apparatus of this invention.

Referring to FIG. 12, the filtration apparatus 160 having inlets 162 and 164 for fluid feed, outlets 166 and 168 for retentate and outlets 170 and 172 for permeate. In FIG. 12, like designed cross-sections refer to the same element. The filtration apparatus 160 includes an outer shell 174, a sealing elastomer 176, a feed screen 178, a permeate screen 180 and a membrane 182.

Figure 13:
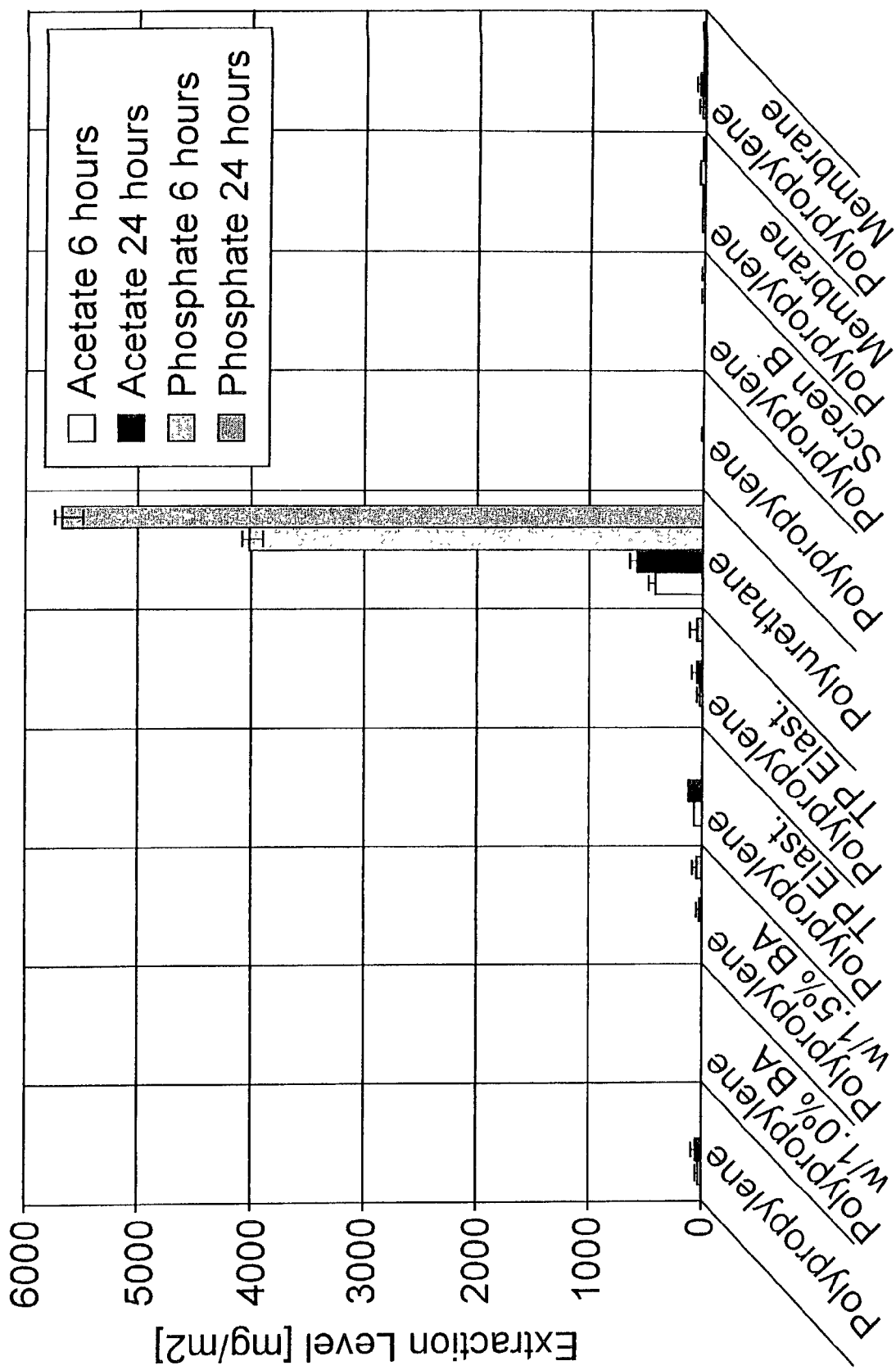
FIG. 13 is a graph showing the relative extractable levels of a variety of polymeric compositions.
Figure 14A:
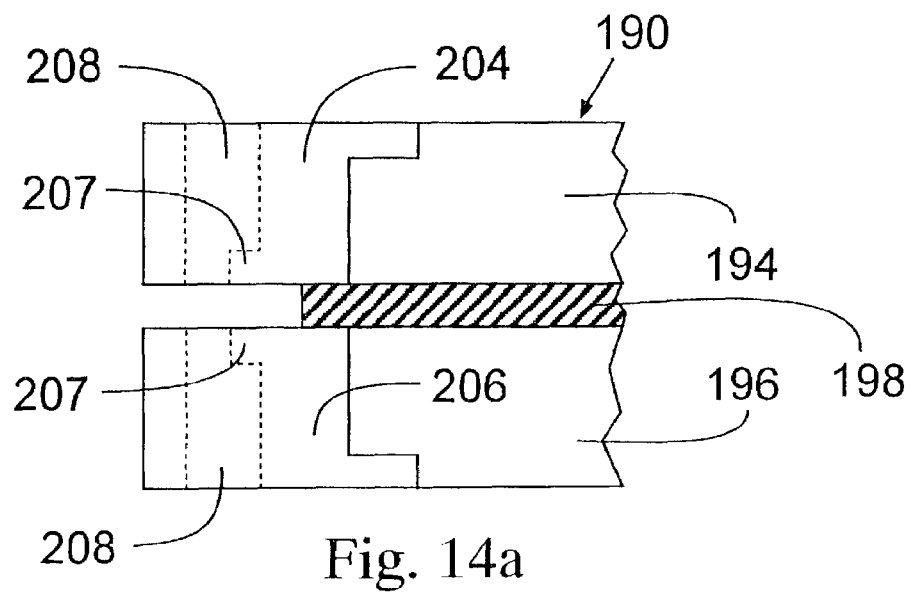
FIG. 14a is a side view of a membrane construction useful for making a filtration module of this invention.
Figure 14B:
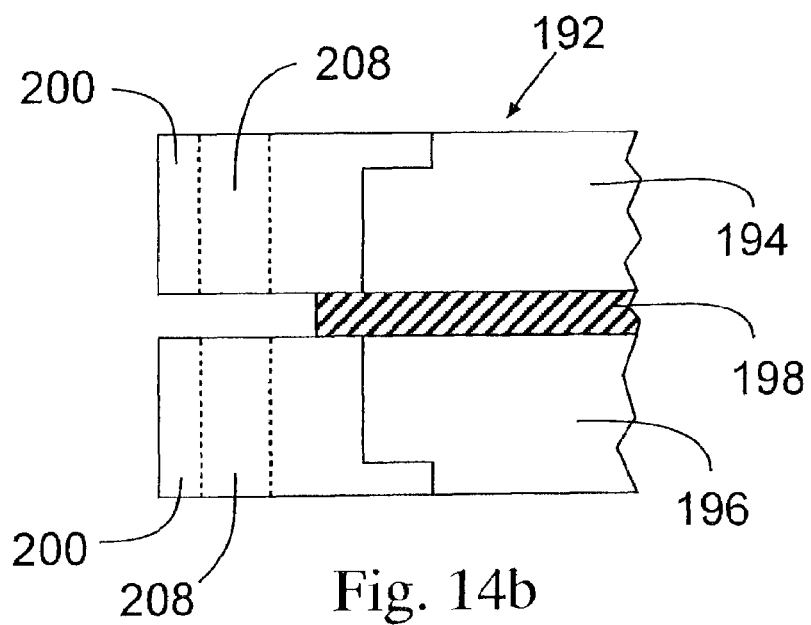
FIG. 14b is a side view of a membrane construction useful for making a filtration module of this invention.
Figure 14C:
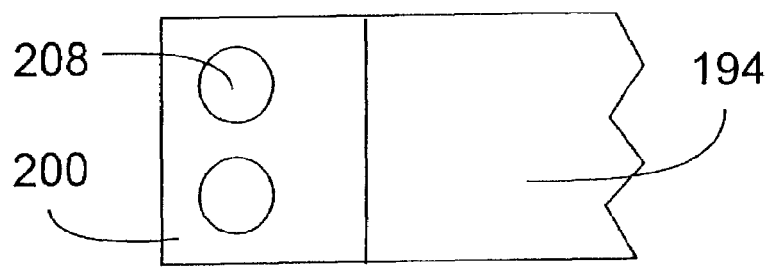
FIG. 14c is a top view of the membrane construction of FIGS. 14a and 14b.

Referring to FIGS. 13a, 13b and 13c, an alternative set of filtration elements is shown which can be utilized to form the filtration module of this invention. The filtration elements 190 and 192 are stacked vertically one upon the other in alternative layers. Each filtration element 190 and 192 includes two membranes 194 and 196, a porous screen 198 and two TPC tabs 200 and 202 or 204 and 206. The filtration element 190 includes two TPC tabs 207 which are fused to each other when a heating element (not shown) is extended through the port 208. The heating element is controlled to selectively melt tabs 207 causing them to fuse together. Filtration element 192 is free of tabs 207 and fusion of TPC is not effected by the heating element. Thus, in a stack of alternating filtration elements 190 and 192 alternating passageways for a liquid to pass into a filtration element 192 are provided. The filtration element 192 is provided with TPC tabs on an open end to that shown which the opposing end of filtration element 190 is free of the TPC tabs. Thus, the opposing ends (not shown) of the filtration elements 192 are blocked while the opposing end of filtration element 190 are open to communication with another port (not shown).

It is to be understood that the membrane layers can be replaced by fluid impermeable layers having spacer layers alternating with it fluid impermeable layers. The fluid impermeable layers can be selectively sealed together in the manner described above so that selective fluid pathways through selected space layers are provided to direct fluid to a desired port which directs fluid into or from the fluid processing module such as a fluid manifold or the like.

The invention claimed is:

1. The process for forming a fluid processing module having a feed port, and at least one permeate port that comprises:
   forming at least one fluid permeable spacer layer having a feed port and at least two membrane filter layers each having a permeate port wherein said at least one spacer layer is positioned alternately with said at least two filter layers in vertical direction,
   providing at least one thermoplastic section secured to one end of said two filter layers extending into said ports in a configuration such that when said at least one thermoplastic section is melted, sealing of said at least two filter layers in said feed port is effected such that liquid in said at least one permeate port is not admixed with liquid in said feed port, and
   heat sealing said at least one thermoplastic section in one of said ports by extending a radiant heating element in said port and energizing said heating element to effect heating of said at least one thermoplastic section in said port to effect heating of all the thermoplastic sections in said port simultaneously.

2. The process of claim 1 wherein said heating by the radiant heating element is in the feed port.

3. The process of claim 1 wherein said at least one spacer layer are at least two in number and said heating is effected by extending a radiant heating element in one of said ports and energizing said heating element to effect heating of all said thermoplastic sections in said port simultaneously.

4. The process of claim 1 wherein said at least one spacer layer is a plurality of spacer layers and said at least two filter layers are a plurality of filter layers and said spacer layers and filter layer are arranged in alternate layers and said heating is effected by extending a radiant heating element in at least one of said ports and energizing said heating element to effect heating of all of said thermoplastic sections in said port.

5. The process of claim 1 wherein said at least one spacer layer is a plurality of spacer layers and said at least two filter layers are a plurality of filter layers and said spacer layers and filter layers are arranged in alternate layers and said heating is effected by extending a plurality of radiant heating elements in said ports and energizing said heating element to effect heating of all of said thermoplastic sections in said ports simultaneously.

6. The process of claim 1 wherein said heating by the radiant heating element is in the permeate port.

7. The process of claim 1 wherein said heating by the radiant heating element is in the feed port and then the permeate port.

8. The process of claim 1 wherein said heating by the radiant heating element is in the permeate port and then the feed port.

9. The process of claim 1 wherein said heating by the radiant heating element is in the retentate port, then the permeate port and then the feed port.

10. The process of claim 1 wherein said heating by the radiant heating element is in the retentate port, then the feed port and then the permeate port.

11. The process of claim 1 further comprising a retentate port and further comprising the step of providing at least one thermoplastic section secured to each of said two or more filter layers extending into said retentate port in a configuration such that when said at least one thermoplastic section is melted, sealing of said at least two filter layers in said retentate port is effected such that liquid in said at least one permeate port is not admixed with liquid in said retentate or feed port.

12. The process for forming a fluid processing module comprising at least one feed port, and at least one permeate port,
   forming at least two permeable spacer layers, each having a feed port and at least one membrane filter layer having a retentate port wherein said at least two spacer layers are positioned alternatively with said at least one filter layer in a vertical direction,
   providing at least one thermoplastic section secured to said at least two spacer layers to at least one end of said spacer layers extending into said ports in a configuration such that when said at least one section is melted, sealing of said at least two spacer layers in said at least one permeate port is effected such that liquid in said at least one permeate port is not admixed with liquid in said feed port,
   and heat sealing said at least one thermoplastic section in said ports by extending a radiant heating element in said ports and energizing said heating element to effect heating of said at least one thermoplastic section in said ports to effect heating of all of the thermoplastic sections in said port simultaneously.

13. The process of claim 1 wherein said at least one filter layer are at least two in number and said heating is effected by extending a radiant heating element in one of said ports and energizing said heating element to effect heating of said thermoplastic simultaneously.

14. The process of claim 1 wherein said at least two spacer layers are a plurality of spacer layers and said at least one filter layer is a plurality of filter layers and said spacer layers and filter layers are arranged in alternate layers and said heating is effected by extending a radiant heating element in at least one of said ports and energizing said heating element to effect heating of all of said thermoplastic sections in said port.

15. The process of claim 1 further comprising a retentate port and wherein said at least two spacer layers are a plurality of spacer layers and said at least one filter layer is a plurality of filter layers and said spacer layers filter layers are arranged in alternate layers and said heating is effected by extending a radiant heating element in at least one of said ports and energizing said heating element to effect heating of all of said thermoplastic sections in said port.

16. The process of claim 1 wherein said at least two spacer layers are a plurality of spacer layers and said at least one filter layer is a plurality of filter layers and said spacer layers and filter layers are arranged in alternate layers and said heating is effected by extending a plurality of radiant heating elements in said ports and energizing said heating element to effect heating of all of said thermoplastic sections in said ports simultaneously.

17. The process for forming a fluid processing module comprising at least one feed port and at least one permeate port,
   forming at least two fluid permeable spacer layers having a feed port and at least one membrane filter layer having a permeate port, wherein said at least two spacer layers are positioned alternately with said at least one filter layer in a vertical direction,
   providing at least one thermoplastic section secured to at least one end of said spacer layers extending into a permeate port in a configuration such that when said at least one section is melted, sealing of said spacer layers in said permeate port is effected such that liquid in said permeate port is not admixed with liquid in a feed port, providing at least one thermoplastic section secured to at least one end of said at least one filter layer extending into a feed port in a configuration such that when said at least one section is melted, sealing of said filter layers in said feed port is effected such that liquid in said feed port is not admixed with liquid in said permeate port, and heat sealing said at least one thermoplastic section in said ports by extending a radiant heating element in said ports and energizing said heating element to effect heating of said at least one thermoplastic section in said ports to effect heating of all of the thermoplastic sections in said port simultaneously.

18. The process for forming a fluid processing module comprising at least one feed port, at least one retentate port and at least one permeate port, forming at least one fluid permeable spacer layers having a feed port and at least two membrane filter layer having a permeate port wherein said at least one spacer layer is positioned alternately with said at least two filter layers in a vertical direction, providing a thermoplastic section secured to an end of each of said at least two filter layers extending into the feed port in a configuration such that when said thermoplastic sections are melted, sealing of said filter layers in said feed port is effected such that liquid in said feed port is not admixed with liquid in a permeate port, providing a thermoplastic section secured to an end of each said at least two filter layers extending into a retentate port in a configuration such that when said thermoplastic sections are melted, sealing of said filter layers in said retentate port is effected such that liquid in said retentate port is not admixed with liquid in said permeate port, and heat sealing said at least one thermoplastic section in said ports by extending a radiant heating element in said ports and energizing said heating element to effect heating of said thermoplastic sections in said ports to effect heating of all of the thermoplastic section in said port simultaneously.

* * * * *